(12) United States Patent
Scherabon

(10) Patent No.: US 7,498,924 B2
(45) Date of Patent: Mar. 3, 2009

(54) ANTICOLLISION METHOD THAT MARKS THE TIME SLOTS

(75) Inventor: Christian Scherabon, Graz (AT)

(73) Assignee: NXP B.V., Eindhoven (NL)

( * ) Notice: Subject to any disclaimer, the term of this patent is extended or adjusted under 35 U.S.C. 154(b) by 567 days.

(21) Appl. No.: 10/522,091

(22) PCT Filed: Jul. 18, 2003

(86) PCT No.: PCT/IB03/03283

§ 371 (c)(1),
(2), (4) Date: Jan. 21, 2005

(87) PCT Pub. No.: WO2004/012134

PCT Pub. Date: Feb. 5, 2004

(65) Prior Publication Data

US 2005/0237156 A1     Oct. 27, 2005

(30) Foreign Application Priority Data

Jul. 25, 2002    (EP) .................................. 02102057

(51) Int. Cl.
*H04Q 5/22* (2006.01)

(52) U.S. Cl. .................... 340/10.2; 340/10.1; 340/10.3; 340/10.4

(58) Field of Classification Search ............... 340/10.2, 340/10.1, 10.3, 10.32, 10.31, 10.5, 10.4, 340/870.13; 370/321, 337, 347
See application file for complete search history.

(56) References Cited

U.S. PATENT DOCUMENTS

| | | | |
|---|---|---|---|
| 5,929,779 A * | 7/1999 | MacLellan et al. ......... 340/10.2 |
| 6,725,014 B1 * | 4/2004 | Voegele ..................... 455/41.2 |
| 7,009,496 B2 * | 3/2006 | Arneson et al. ............ 340/10.2 |
| 7,253,717 B2 * | 8/2007 | Armstrong et al. ......... 340/10.2 |

* cited by examiner

*Primary Examiner*—Brian A Zimmerman
*Assistant Examiner*—Vernal U Brown

(57) ABSTRACT

During the implementation of an anticollision method by a reader station (1) to identify all data carriers (2, 3, 4) in the communication field (HF), in order to shorten the time slots (S) in which none of the data carriers (2, 3, 4) is responding or in which a collision of multiple responses from the data carriers (2, 3, 4) occurs, a time-slot progressing information (ZWI) is sent by the reader station (1). The time-slot progressing information (ZWI) contains a time-slot number (ZN), which identifies the time slot (Si) next in line after the current time slot (S).

16 Claims, 2 Drawing Sheets

ANTICOLLISION METHOD THAT MARKS THE TIME SLOTS

The invention relates to an anticollision method to identify data carriers arranged in a communication field of a reader station, which method involves the following steps:

sending interrogation information from the reader station to all data carriers arranged in the communication field, as a result of which the start of a quantity of N successive time slots is defined;

sending response information from the data carriers to the reader station, wherein each data carrier selects one of the N time slots to send its response information identifying the data carrier;

sending a time-slot progressing information, for progressing from the current time slot to the time slot following next in line, from the reader station to the data carriers.

The invention further relates to a data carrier to respond to an interrogation information received from a reader station with a response information identifying the data carrier during one of N time slots, with receiver means to receive the interrogation information and the time-slot progressing information from the reader station, and with time-slot definition means, which are designed to define the sequence of the N time slots as a function of the instant of reception of the interrogation information, wherein, on receipt of the time-slot progressing information, progressing takes place from the current time slot to the time slot following next in line, and with sending-definition means to define one of the N time slots as a return time slot in which the data carrier sends the response information to the reader station, and with sending means to send the response information to the reader station.

The invention also relates to a reader station to identify data carriers, which are arranged in a communication field of the reader station, with sending means to send an interrogation information and a time-slot progressing information to all data carriers arranged in the communication field, wherein, as a result of the interrogation information, the start of a quantity of N successive time slots is defined, and wherein, as a result of the time-slot progressing information, progressing takes place from the current time slot to the time slot following next in line, and with receiver means to receive a response information from the data carriers in the communication field, wherein each data carrier individually selects one of the N time slots as the return time slot to send its response information identifying the data carrier, and with time-slot evaluation means to evaluate the response information received from the data carriers in the particular time slot.

An anticollision method of this kind, a data carrier of this kind and a reader station of this kind are known from document EP 0 957 442 B. This document discloses an anticollision method in which the reader station sends an interrogation information to all data carriers located in the communication field. Both in the reader station and in the data carriers, the interrogation information initializes the start of a quantity of N successive time slots. Each of the N time slots has a specified time-slot duration.

Each of the known data carriers is equipped with a random-number generator, which randomly defines one of the N time slots as a return time slot. In the return time slot selected by the particular data carrier, the data carrier sends a response information, which contains the serial number of the data carrier and thereby identifies the data carrier. At the end of each time slot, the reader station sends a time-slot progressing information, upon which a change is made from the current time slot to the time slot following next in line. The reader station identifies one data carrier after another, and, following the implementation of the anticollision method, can construct a direct communication with one of the data carriers in the communication field at a time.

It may happen that, in one of the time slots, none of the data carriers sends its response information to the reader station. Awaiting the entire duration of the time slot delays the progressing of the anticollision method unnecessarily since, during this current time slot, none of the data carriers can be identified, for which reason the known reader station sends out the time-slot progressing information earlier in this case. The known time-slot progressing information is formed by a single pulse. On receipt of the time-slot progressing information, all data carriers change over from the current time slot to the one following next in line. It may further occur that two or more data carriers respond simultaneously in the current time slot, and a so-called collision occurs. Neither are time slots in which a collision occurs appropriate for identifying one of the data carriers contained in the communication field, for which reason the reader station again sends the time-slot progressing information to the data carriers in this case too.

With the known anticollision method, with the known data carrier and with the known reader station, it has emerged that it may happen that one or more of the data carriers has not received the time-slot progressing information. This may occur if, for instance, a data carrier is moved very rapidly in the communication field, or if multiple data carriers are located one above the other and mutually interfere with reception. Even if just one of the data carriers in the communication field has not received the time-slot progressing information, then the time slots defined in this data carrier by the time-slot definition means no longer agree with the time slots defined by the other data carriers and by the reader station, for which reason defects occur, which is extremely disadvantageous.

It is an object of the invention to create an anticollision method in accordance with the generic type mentioned in the first paragraph, a data carrier in accordance with the generic type mentioned in the second paragraph and a reader station in accordance with the generic type mentioned in the third paragraph, in all of which the aforementioned disadvantages are avoided. In order to achieve the above-mentioned object, in an anticollision method of this kind, the time-slot progressing information comprises a time-slot characterizing information, which identifies one of the N time slots, and which is evaluated by the data carriers in order to establish the current time slot in each case.

In order to achieve the above-mentioned object, in a data carrier of this kind, the time-slot progressing information comprises a time-slot characterizing information, which identifies one of the N time slots, and the time-slot definition means are designed to evaluate the time-slot characterizing information in order to determine the current time slot in each case.

In order to achieve the above-mentioned object, in a reader station of this kind, the reader station is designed to send a time-slot progressing information comprising a time-slot characterizing information, wherein the time-slot characterizing information identifies one of the N time slots and is evaluated by the data carriers in order to establish the current time slot in each case.

By virtue of the features in accordance with the invention, it is achieved that the time-slot progressing information sent out by the reader station comprises a time-slot characterizing information, which identifies the time slot following next in line. By evaluating the time-slot characterizing information, each data carrier can establish if, by any chance, a time-slot progressing information has not been received. It is thereby ensured that the time slots defined in the reader station and in all data carriers in the communication field all agree, and a reliable identification of all data carriers in the communication field by the reader station is enabled.

In accordance with the measures claimed in claim 2 and claim 12, the advantage is obtained that the time-slot progressing information, including the time-slot characterizing information, is sent even if a time slot is shortened.

In accordance with the measures claimed in claims 3, 8 and 13, the advantage is obtained that the time-slot characterizing information requires only a very short time duration, and the entire anticollision method is scarcely lengthened perceptibly as a result of the inclusion of the time-slot characterizing information.

In accordance with the measures claimed in claims 4, 9 and 14, the advantage is obtained that a consecutive time-slot number is identified as a result of a train of multiple pulses of the time-slot characterizing information, and determination of the current time slot is possible especially simply and reliably.

In accordance with the measures claimed in claims 5, 10 and 14, the advantage is obtained that, as a result of the evaluation of the checksum, errors in the time-slot numbers that have occurred during transmission can be recognized immediately.

In accordance with the measures claimed in claims 6 and 16, the advantage is obtained that, during time slots of this kind, it is certain that no data carrier can be identified, and the anticollision method can be shortened if the change to the next time slot in line takes place immediately.

The invention will be further described with reference to examples of embodiments shown in the drawings, to which, however, the invention is not restricted.

Figure 1:
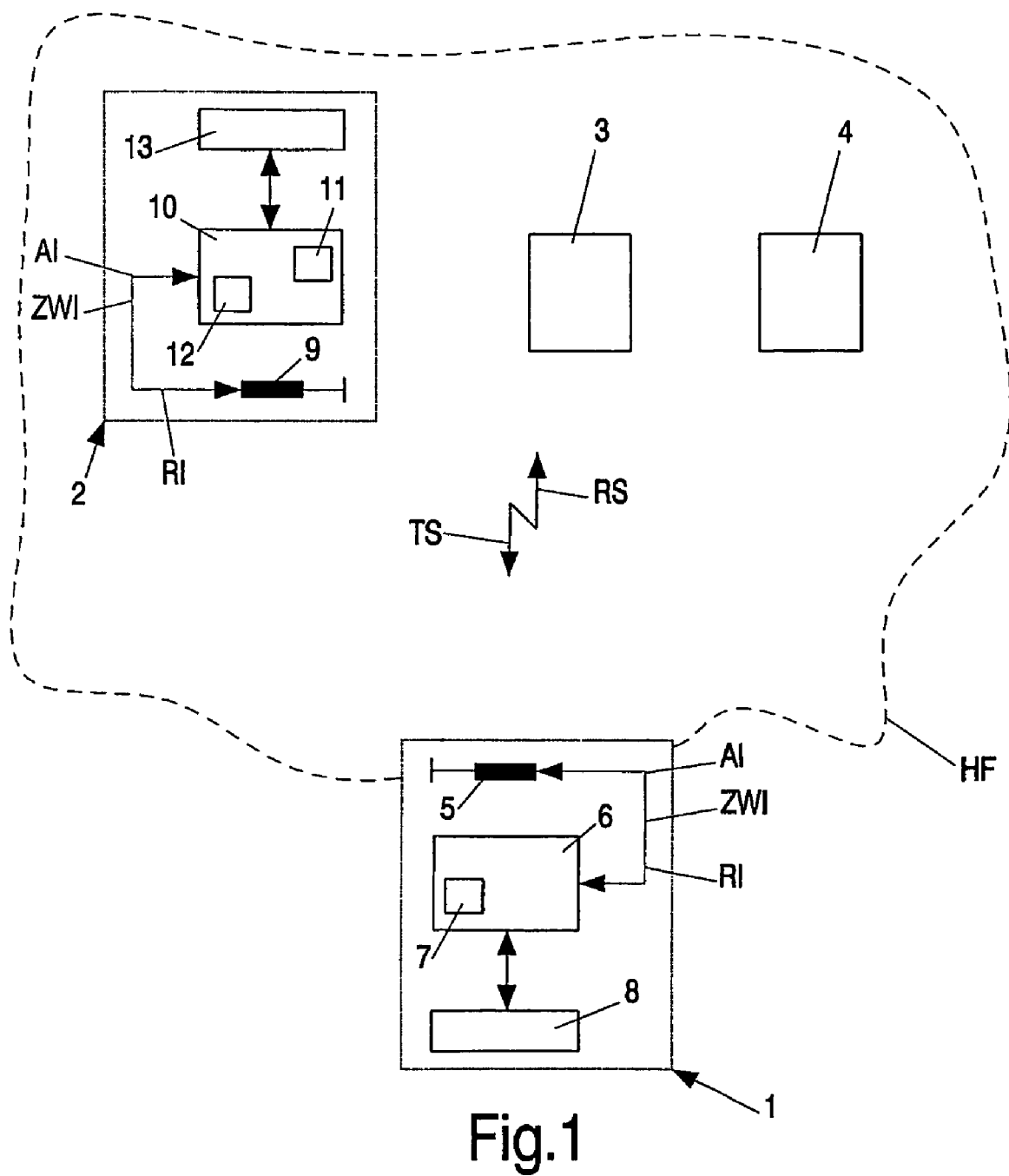
FIG. 1 shows three data carriers, which are arranged in the communication field of a reader station.

FIG. 1 shows a reader station 1, which is designed to communicate via a communication field HF with data carriers 2, 3 and 4, arranged in the communication field HF, wherein data carrier 2 is shown in greater detail. In order to be able to communicate with the individual data carriers 2, 3 and 4 arranged in communication field HF, reader station 1 must first identify data carriers 2, 3 and 4. To this end, an anticollision method is implemented, which will be discussed in greater detail below with reference to FIG. 2.

Reader station 1 is equipped with sender means 5, which is designed to generate communication field HF with a frequency of 13.56 MHz, and to send a reader signal RS. Reader signal RS may comprise inter alia an interrogation information AI and a time-slot progressing information ZWI, wherein the start of a quantity of N successive time slots S is defined by interrogation information AI and wherein, as a result of the time-slot progressing information ZWI, progress takes place from the current time slot S to the next time slot in line Si.

Reader station 1 is further equipped with receiver means 5 to receive a data carrier signal TS from data carriers 2, 3 and 4. Data-carrier signal TS may contain inter alia a response information RI, wherein each data carrier 2, 3 and 4 individually selects one of the N time slots S as a return time slot for sending its response information RI, identifying data carriers 2, 3 or 4. Response information RI is hereby formed by a serial number for data carrier 2, 3 or 4, which is stored in the particular data carrier 2, 3 or 4 and unambiguously identifies data carrier 2, 3 or 4. Sender/receiver means 5 of this kind have been known for a long time, for which reason no further details are given here.

Reader station 1 is further equipped with processing means 6, in the form of a microprocessor, which is connected to the sender/receiver means 5 and designed to process the information received and to be sent. Processing means 6 is hereby also equipped with time-slot evaluation means 7, which is designed to evaluate the response information RI received during time slot S from data carriers 2, 3 and 4.

Reader station 1 is further equipped with storage means 8. Following the implementation of the anticollision method, reader station 1 communicates with the individual data carriers 2, 3 and 4 arranged in communication field HF, and hereby reads, for example, information stored in data carriers 2, 3 and 4, which information can be stored in storage means 8.

Data carriers 2, 3 and 4 are equipped with sender/receiver means 9 to send data-carrier signal TS and receive reader signal RS from reader station 1. Data carriers 2, 3 and 4 are formed by passive data carriers, and derive a clock signal and the operating voltage for operating the data carriers from the electromagnetic communication field HF. In order to send response information RI and other information, communication field HF is loaded in accordance with load modulation.

Data carriers 2, 3 and 4 are further equipped with processing means 10 in the form of a control unit, which is connected to the sender/receiver means 9 and is designed to process the information received and to be sent. Processing means 10 is hereby also equipped with time-slot definition means 11, which is designed to define the sequence of the N time slots S as a function of the instant of reception of the interrogation information AI, wherein, on receipt of the time-slot progressing information ZWI, progressing takes place from the current time slot S to the time slot Si following next in line. Processing means 10 is further equipped with sending-definition means 12 to define one of the N time slots S as a return time slot in which data carrier 2, 3 or 4 send the response information RI to reader station 1. Sending-definition means 12 is equipped with a random-number generator with the aid of which, following each receipt of an interrogation information AI, one of the N=4 time slots S1, S2, S3 or S4 is defined as the return time slot. It may be mentioned that the sending-definition means can also derive the return time slot from the serial number of the data carrier and from other information.

Data carriers 2, 3 and 4 are further equipped with storage means 13. In storage means 13 is stored the serial number of the particular data carrier 2, 3, 4, and other information, which can be interrogated or amended by reader station 1 following the implementation of the anticollision method.

Figure 2:
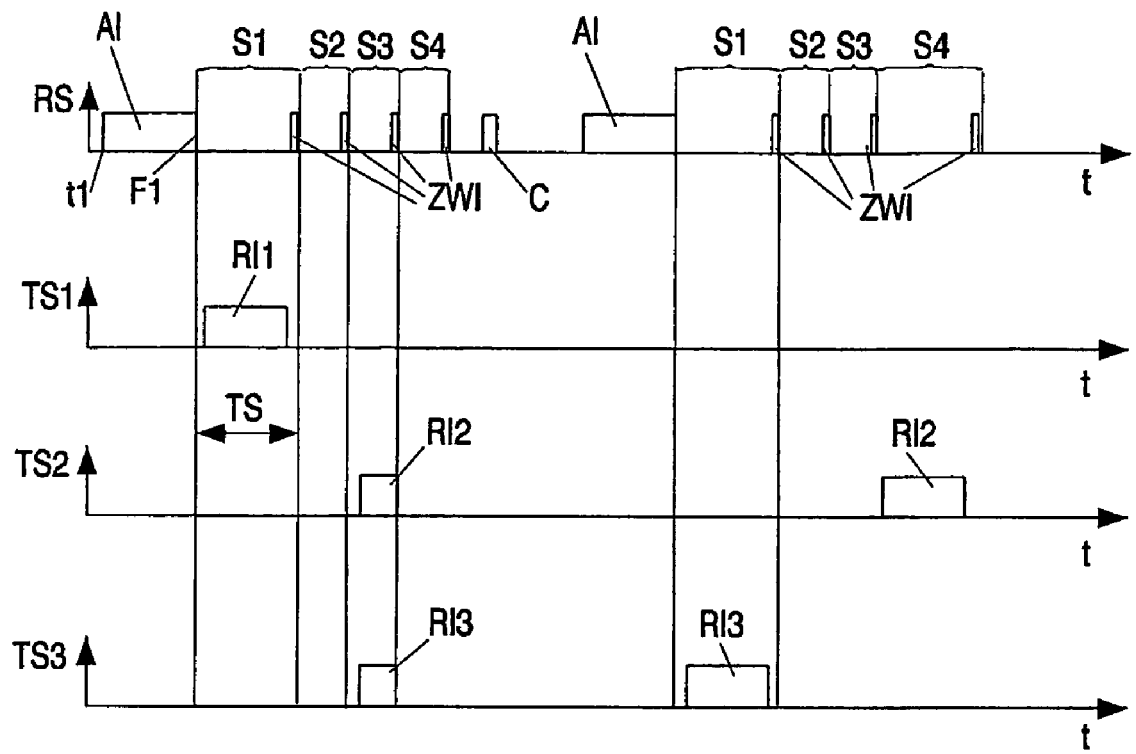
FIG. 2 shows signals that are sent and received by the data carriers and by the reader station in the communication field.

Below, the function of data carriers 2, 3, 4 and reader station 1 in implementing the anticollision method is explained in greater detail with reference to an embodiment example and FIG. 2. In accordance with the embodiment example, it is assumed that the three data carriers 2, 3, 4 form electronic travel tickets and have been introduced into the communication field HF in order to pay a subway fare. In order to deduct the fare from data carriers 2, 3, 4, reader station 1 first has to determine the serial numbers of the data carriers located in communication field HF, for which reason reader station 1 sends the interrogation information AI at an instant t1.

In accordance with the anticollision method, starting from the trailing edge F1 of interrogation information AI, N=4 time slots S1 to S4 are each defined with a time-slot duration of, for example, TS=5 mS. The time-slot definition means 11 of data carriers 2, 3, 4 detects the edge F1 for this purpose. As soon as sending-definition means 12 detects an interrogation information AI, it determines one of the four time slots S as the return time slot for the data carrier 2, 3 or 4. In accordance with the embodiment example, the sending-definition means 12 of data carrier 2 defines the first time slot S1, and the sending-definition means 12 of data carriers 3 and 4 define the third time slot S3 as return time slots.

In the first data-carrier signal TS1 during the first time slot S1, the first data carrier 2 sends its serial number "2230013" as response information RI1 to reader station 1. The time-slot evaluation means 7 of reader station 1 evaluates the received response information RI1. Following the complete receipt of response information RI1, reader station 1 sends a time-slot progressing information ZWI to the data carriers in communication field HF. On receipt of time-slot progressing information ZWI, all time-slot definition means in data carriers 2, 3, 4 switch from the current time slot S1 to the time slot S2 following next in line.

The identification of data carriers 2, 3, 4 and the subsequent communication in order to deduct the fare from data carriers 2, 3, 4 has to take place as quickly as possible in order that the fare is reliably deducted from each of the possibly very many data carriers arranged in communication field HF. For this purpose, an opportunity is created in the anticollision method to shorten the time slot duration of those time slots S that are inappropriate for identifying one of the data carriers in the communication field. For this purpose, reader station 1 sends time-slot progressing information ZWI to the data carriers in communication field HF if it has been established by the time-slot evaluation means 7, through evaluation of the information received at the start of the particular time slot S, that more than one of data carriers 2, 3 or 4 are responding in the current time slot S, or if it has been established by time-slot evaluation means 7 that none of the data carriers 2, 3, 4 is responding in the current time slot S.

In accordance with the present example, none of data carriers 2, 3, 4 responds in either of time slots S2 or S4, and a collision occurs in time slot S3, since the two data carriers 3 and 4 send their response information RI2 and RI3 in this time slot S3. Reader station 1 therefore sends time-slot progressing information ZWI before the expiry of time-slot duration TS, as a result of which the duration of implementation of this first part of the anticollision method can be advantageously considerably shortened.

In practice, it has emerged that it may happen that one or more of the data carriers arranged in communication field HF does not receive the time-slot progressing information ZWI, and therefore does not switch to the next time slot until the next time-slot progressing information ZWI is received. This may happen especially if data carriers are arranged one above the other and receipt by reception means 5 is impeded. Likewise, this may occur if data carriers are moved rapidly in the communication field or are arranged at the edge of the communication field. In this event, time slots S do not progress in this data carrier synchronously with the time slots S in the other data carriers and in the reader station, as a result of which the reliable identification of the data carriers in the communication field is jeopardized.

Reader station 1 is designed to send a time-slot progressing information ZWI, which identifies one of the N=4 time slots S and is evaluated by time-slot definition means 11 of data carriers 2, 3, 4 in order to establish the current time slot S in each case. In accordance with the embodiment example, time-slot progressing information ZWI contains a time-slot number ZN, which identifies the time slot Si following the current time slot S. The time-slot number ZN, transmitted in time-slot progressing information ZWI to end the current second time slot S2, thereby identifies the third time slot S3. As a result, an especially simple evaluation is advantageously enabled in the time-slot definition means 11.

Figure 3:
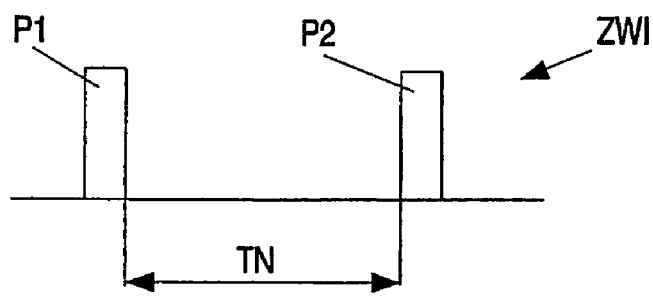
FIG. 3 shows a time-slot definition information formed from two pulses with a variable pulse interval.
Figure 4:
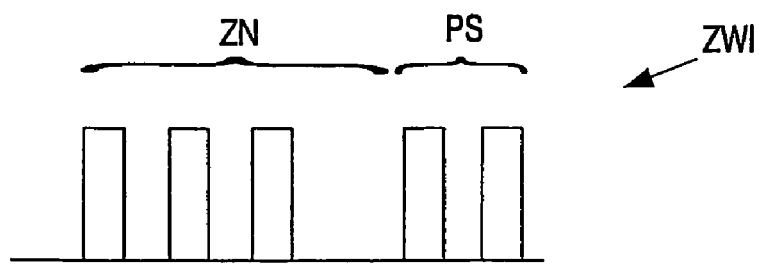
FIG. 4 shows a time-slot definition information, which is formed from multiple pulses to identify the time slot following next in line, and which contains a checksum.

FIG. 3 and FIG. 4 show two of many options that suggest themselves to the person skilled in the art for transmitting time-slot number ZN from reader station 1 to data carriers 2, 3, 4. In accordance with FIG. 3, time-slot progressing information ZWI comprises two pulses P1 and P2, wherein the time duration TN between the pulses P1 and P2 identifies the following time slot Si in each case. TN could, for instance, be determined as TN=(ZN*TK)+TK, wherein TK is a constant time duration. The time-slot definition means 11 of data carriers 2, 3, 4 could determine the time-slot number ZN of the following time slot S by measuring the time duration between pulses P1 and P2. Through this unambiguous identification of the following time slot S in time-slot progressing information ZWI in each case, a reliable identification of all data carriers in the communication field is ensured.

In accordance with FIG. 4, for an anticollision method with N=8 time slots, time-slot progressing information ZWI contains time-slot number ZN and a checksum PS for the data security of the time-slot number ZN. The possible time-slot numbers ZN=1 to ZN=8 are coded by four pulse positions. An especially reliable transmission of time-slot numbers ZN is ensured hereby.

Following on from the four time slots S1 to S4, reader station 1 sends a command C to the already identified data carrier 2 and switches it into quiescent mode for the further implementation of the anticollision method. This gives rise to the advantage that the already identified data carrier 2 no longer responds during a now following second part of the anticollision method, and the implementation of the anticollision method as a whole can thereby be accelerated.

In accordance with the present example, in the second part of the anticollision method, reader station 1 sends a further interrogation information AI to the data carriers 2, 3, 4 arranged in communication field HF in order to identify the data carriers 3 and 4 not identified in the first part of the anticollision method. Data carrier 2 no longer responds to this interrogation information AI, since it has already been unambiguously identified and switched into quiescent mode by reader station 1. Data carrier 4 responds in the first time slot S1, and data carrier 3 responds in the fourth time slot S4, for which reason, following the implementation of the second part of the anticollision method, all data carriers 2, 3, 4 in communication field HF have been identified. Advantageously, time slots S2 and S3 were also shortened in the second part of the anticollision method, and the following time slot S in each case was identified by time-slot number ZN in time-slot progressing information ZWI.

It may be mentioned that the anticollision method in accordance with the invention may be implemented with a very great quantity of active or passive data carriers in the communication field. A quantity of time slots as great as required can also be defined.

It may be mentioned that it may also be desirable to shorten a time slot if the time-slot evaluation means has already established a transmission error in the response information from the data carrier in the course of the duration of the time slot.

The invention claimed is:

1. An anticollision method to identify data carriers arranged in a communication field of a reader station, which method involves the following steps:

sending interrogation information from the reader station to all data carriers arranged in the communication field, as a result of which the start of a quantity of N successive time slots is defined;

sending response information from the data carriers to the reader station, wherein each data carrier selects one of the N time slots to send its response information identifying the data carrier;

sending a time-slot progressing information, for progressing from the current time slot to the time slot following next in line, from the reader station to the data carriers, characterized in that the time-slot progressing information comprises a time-slot characterizing information formed by multiple pulses, wherein the multiple pulses identify one of the N time slots, and which is evaluated by the data carriers in order to establish the current time slot in each case.

2. An anticollision method as claimed in claim 1, characterized in that the time-slot progressing information is sent by the reader station if it has been established by the reader station that the current time slot is inappropriate for identifying one of the data carriers.

3. An anticollision method as claimed in claim 1, characterized in that the time-slot characterizing information is formed by two pulses, wherein the time duration of a pulse interval between the two pulses identifies one of the N time slots.

4. An anticollision method as claimed in claim 1, wherein the multiple pulses of the time-slot characterizing information identify a consecutive time-slot number.

5. An anticollision method as claimed in claim 4, characterized in that the time-slot characterizing information contains a checksum of the time-slot number.

6. An anticollision method as claimed in claim 1, characterized in that the reader station sends the time-slot progressing information if has been established by the reader station that more than one of the data carriers are responding in the current time slot, or if it has been established by the reader station that none of the data carriers is responding in the current time slot.

7. A data carrier to respond to an interrogation information received from a reader station with a response information identifying the data carrier during one of N time slots, with receiver means to receive the interrogation information and the time-slot progressing information from the reader station, and with time-slot definition means, which are designed to define the sequence of the N time slots as a function of the instant of reception of the interrogation information, wherein, on receipt of the time-slot progressing information, progressing takes place from the current time slot to the time slot following next in line, and with sending-definition means to define one of the N time slots as a return time slot in which the data carrier sends the response information to the reader station; and with sending means to send the response information to the reader station, characterized in that the time-slot progressing information comprises a time-slot characterizing information formed by multiple pulses, wherein the multiple pulses identify one of the N time slots, and that the time-slot definition means are designed to evaluate the time-slot characterizing information in order to determine the current time slot in each case.

8. A data carrier as claimed in claim 7, characterized in that the time-slot definition means comprise a counter, which is designed to determine the time duration of a pulse interval between two pulses of the time-slot characterizing information.

9. A data carrier as claimed in claim 7, characterized in that the time-slot definition means are designed to evaluate the multiple pulses of the time-slot characterizing information to identify consecutive time-slot numbers.

10. A data carrier as claimed in claim 9, characterized in that the time-slot definition means are designed to evaluate a checksum of the time-slot number contained in the time-slot characterizing information.

11. A reader station to identify data carriers which are arranged in a communication field of the reader station, with sending means to send an interrogation information and a time-slot progressing information to all data carriers arranged in the communication field, wherein, as a result of the interrogation information, the start of a quantity of N successive time slots is defined, and wherein, as a result of the time-slot progressing information, progressing takes place from the current time slot to the time slot following next in line, and with receiver means to receive a response information from the data carriers in the communication field, wherein each data carrier individually selects one of the N time slots as the return time slot to send its response information identifying the data carrier; and with time-slot evaluation means to evaluate the response information received from the data carriers in the particular time slot characterized in that the reader station is designed to send a time-slot progressing information comprising a time-slot characterizing information formed by multiple pulses, wherein the multiple pulses identify one of the N time slots, and is evaluated by the data carriers in order to establish the current time slot in each case.

12. A reader station as claimed in claim 11, characterized in that the sender means are designed to send the time-slot progressing information if it has been established by the time-slot evaluation means that the current time slot is inappropriate for identifying one of the data earners.

13. A reader station as claimed in claim 11, characterized in that the time-slot characterizing information is formed by two pulses, wherein the time duration of a pulse interval between the two pulses identifies one of the N time slots.

14. A reader station as claimed in claim 11, wherein the multiple pulses of the time-slot characterizing information identify a consecutive time-slot number.

15. A reader station as claimed in claim 14, characterized in that the time-slot characterizing information contains a checksum of the time-slot number.

16. A reader station as claimed in claim 11, characterized in that the reader station sends the time-slot progressing information if it has been established by the time-slot evaluation means that more than one of the data carriers are responding in the current time slot, or if it has been established by the time-slot evaluation means that none of the data carriers is responding in the current time slot.

* * * * *